Figure 1:
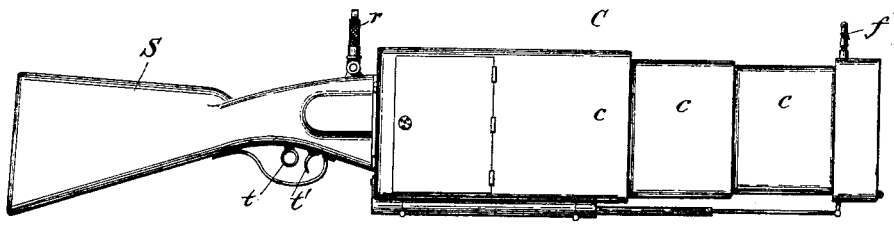

No. 624,693. Patented May 9, 1899.
B. D. SHEFFIELD.
PHOTOGRAPHIC CAMERA.
(Application filed July 30, 1898.)
(No Model.)

Witnesses

Inventor
Benjamin David Sheffield,
By his Attorney
F. H. Richards.

UNITED STATES PATENT OFFICE.

BENJAMIN D. SHEFFIELD, OF LIVINGSTON, MONTANA.

PHOTOGRAPHIC CAMERA.

SPECIFICATION forming part of Letters Patent No. 624,693, dated May 9, 1899.

Application filed July 30, 1898. Serial No. 687,254. (No model.)

*To all whom it may concern:*

Be it known that I, BENJAMIN D. SHEFFIELD, a citizen of the United States, residing in Livingston, in the county of Park and State of Montana, have invented certain new and useful Improvements in Cameras, of which the following is a specification.

This invention relates to cameras, and especially to that class of cameras known as "gun-cameras," which can be raised to the shoulder and sighted at an object in the same way that a gun is usually raised to the shoulder and aimed.

The main feature of this invention is the provision of an improved gun-camera in which a single-chambered camera of any usual or suitable type may be supported by the stock and turned relatively to the latter to bring either one of the transverse axes of the camera to a determined position relatively to the stock, and thereby enable the operator, when the usual camera of oblong cross-section is employed, to bring the long side of the plate or film, as the case may be, either to the usual horizontal position or else to a vertical position to form a negative of the "panel" type.

Ordinarily the camera proper will be so mounted as to connect with the gun-stock at the central portion of the rear end of the camera, whereby, of course, the rotatable camera may be turned in such a manner that all points thereof will move about a central longitudinal axis passing substantially through the center of the forward end of the stock.

Suitable means should of course be employed for holding the camera in any one of its adjusted positions relatively to the stock; but I prefer to make use of a simple spring-pressed latch for locking the parts together.

The camera will carry the usual shutter mechanism of any suitable type, and this latter is intended to be operated by devices on the gun-stock, these devices being preferably operated by a trigger or triggers in the same manner that a gun is fired.

When the camera is mounted for rotation in the manner just described, it will be seen that some provision must be made for permitting the proper operation of the shutter mechanism when the camera is in either its normal position or so placed as to permit the taking of a panel-picture, and hence I deem it advisable to make use of a universal connection between those parts of the operating mechanism which are mounted on the camera proper and the part or parts of said connections carried directly by the stock. When a suitable universal connection is used as a part of these shutter-operating devices, it will be apparent that the camera may be turned readily on the gun-stock and readjustment of the shutter-operating mechanism will not be necessary.

For taking views of objects at different distances it is very desirable to employ a camera having a changeable focus, and hence I have illustrated herein as the preferred form of this portion of the invention an extensible or telescoping camera the several sections of which may be adjusted for different focal distances in the usual manner. In connection with this telescoping camera I also deem it essential to employ corresponding extensible or telescoping shutter-operating means which may be adjusted readily to conform to different lengths to which the sections of the camera may be adjusted.

Separate shutter-setting and shutter-releasing devices, which, as before stated, will usually be triggers of the ordinary type, may be employed for controlling the operation of the shutter after the gun-camera has been raised to the shoulder and sighted, and for the purpose of sighting the camera properly when taking either an ordinary view or a negative for a panel-picture I may employ, in connection with any suitable rear sight carried by the gun-stock, a pair of fore sights supported by different sides of the camera and disposed, respectively, in this case in the two transverse axes of the camera. These and other features of the invention not hereinbefore described in detail will be fully set forth in the drawings accompanying and forming part of this specification, in which—

Figure 2:
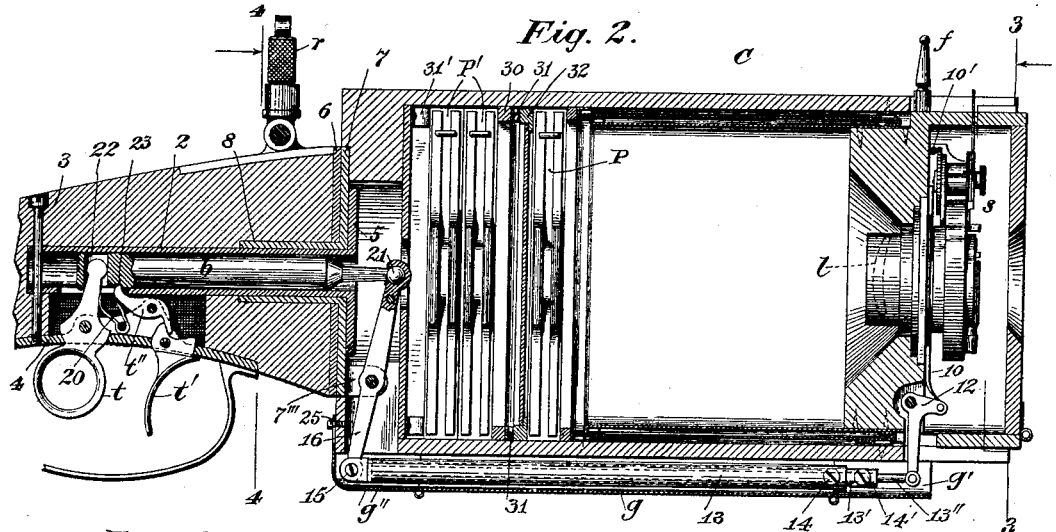
Figure 4:
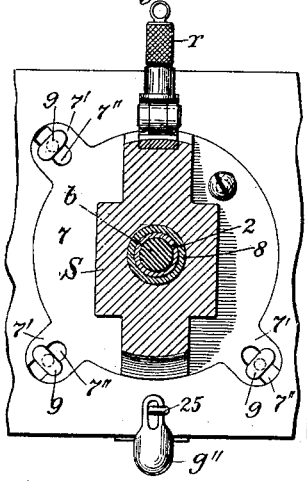
Figure 3:
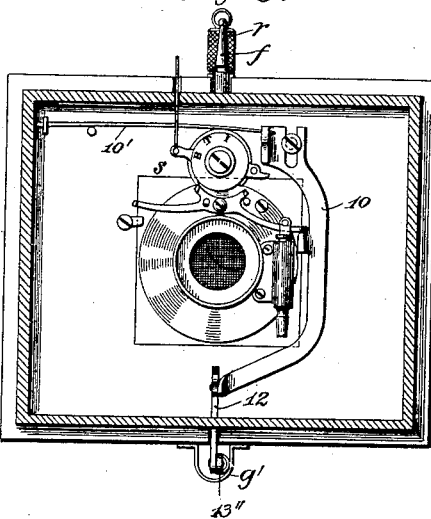
Figure 5:
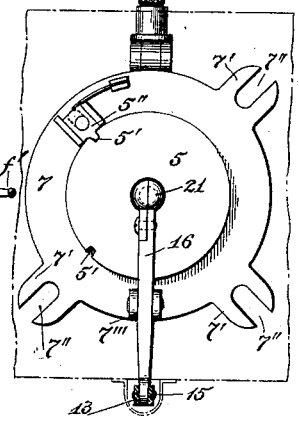

Figure 1 is a side elevation of a gun-camera embodying my present improvements, the camera being shown extended. Fig. 2 is an enlarged longitudinal section of the same with a portion of the gun-stock removed, this view illustrating the camera-sections retracted. Fig. 3 is an enlarged transverse section of the camera, the section being taken in line 3 3, Fig. 2, looking in the direction of the arrow and illustrating the shutter mechanism. Fig. 4 is an enlarged transverse section of the gun-stock, the section being taken in line 4 4, Fig. 2, looking in the direction of the arrow and illustrating the manner in which the stock and the camera are connected. Fig. 5 is an enlarged end elevation of the gun-stock looking toward the left in Fig. 2 and illustrating the latch for holding the camera in its adjusted position relatively to the stock and the universal connection between the shutter actuator or bolt on the gun-stock and the operating connections on the camera.

Similar characters designate like parts in all the figures of the drawings.

In the preferred construction my improved camera embodies as its essential features two main elements, one of which is a stock, such as S, which may be raised to the shoulder and held there to sight the camera, while the other element is the camera proper, which, as before stated, may be of any usual type, such as C, and will preferably be of such construction and so connected to the stock as to be removable readily therefrom and used in the ordinary manner as a hand-camera or tripod-camera. In the present case this camera embodies three sections, such as c, shiftable relatively to one another to form an extensible or telescoping camera adjustable for different focal lengths in the usual manner.

The forward section of the camera will carry the usual lens, as l, and suitable shutter mechanism by means of which light may be permitted to pass to the negative either for an instantaneous exposure, which of course will be the usual one, or for a time exposure of any required length. The shutter mechanism is designated in a general way by s.

For the purpose of making exposures for pictures of the ordinary type or for panel views, as the case may be, it is necessary to mount the camera on the stock S in such a manner that the camera will be capable of turning through an arc of at least ninety degrees to bring the transverse axis of the camera, and hence, of course, of the plate or film, to a determined position with respect to the stock, which position will of course be usually a vertical one in the same plane as the rear sight of the stock. This connection is made to the best advantage when the camera is so supported that its longitudinal axis passes substantially through the center of the forward end of the stock, and hence in the construction illustrated the camera is connected to the forward end of the gun-stock substantially at the center of the rear side of said camera.

The connection between the stock and the rear end of the camera may be of any type that will permit this turning movement just mentioned; but in the construction illustrated, which is a desirable one for the purpose, I have shown a hollow spindle or sleeve, such as 2, passing through a corresponding central longitudinal bore in the forward end of the gun-stock and suitably held in place, as by means of the usual screw-bolt 3, passing through the stock and screwed into the trigger-plate, (designated by 4.) At the forward end thereof the sleeve 2 has secured thereto or formed integral therewith a circular plate or disk 5, which may have locking-notches, as 5', in the periphery thereof. These locking-notches are intended to receive the end of a suitable spring-pressed detent, such as 5'', carried by the stock for holding the stock and the camera in their proper positions relatively to each other. Of course any type of device suitable for locking the camera and the gun together in either position of the camera with respect to the gun may be employed, but the detent and locking-notches just described are simple means for accomplishing this result. At the forward end thereof the stock may have a face-plate, such as 6, with a central opening therein of suitable size through which may pass a suitable connecting member secured to the rear end of the camera C. In the construction shown this connecting member is a plate, such as 7, carried by the camera and having a central tubular member or sleeve 8 projecting therefrom of the same internal diameter as the external diameter of the sleeve 2, and said sleeve may constitute a journal or bearing within which the sleeve 2 may be turned.

When it is desired to remove the camera from the gun-stock and use the former as an ordinary hand-camera, it is very desirable to remove the plates 5, 6, and 7 in their assembled condition and with them the parts carried thereby. Hence in the construction shown the plate 7 is detachably connected to the camera, the connection being effected in this instance by means of a series of buttons 9, screwed into the wood of the rear end of the camera and having elongated heads, which when properly turned may engage the outer faces of projections or lugs 7' on the plate 7 and also may pass through slots 7'' in such lugs. Of course so long as the screw-bolt 3 is in place the plate 7 will be held firmly between the plates 5 and 6 and will be capable of movement only about the common longitudinal axis of the sleeves 2 and 8.

When the camera is removed from the stock just described, it is also necessary to disunite the connections between the trigger mechanism on the stock and the shutter mechanism s. The manner in which this is accomplished will be hereinafter described.

For the purpose of operating the shutter mechanism I may employ any suitable connections between the latter and the stock; but in this instance I have shown at 10 as a part of the shutter mechanism the usual spring-pressed operating-bar, which when shifted in one direction serves to set the shutter and when released will be quickly moved in the other direction by its spring 10' to release the shutter.

Provision is made for taking both time and instantaneous exposures, as will be apparent; but as my present invention is intended primarily for taking instantaneous views and as the construction and operation of the type of shutter mechanism shown herein are well understood a detailed description thereof is deemed unnecessary. At the end thereof opposite the spring 10 the bar 10 is connected in the present case to an angle-lever 12, pivoted on the forward section $c$ of the camera at what is normally the under side of the camera, and one arm of this angle-lever may project through the wall of the camera and be connected to a rod 13″, which in this instance is the forward one of a series of three rods 13, 13′, and 13″, it forming an expansible or telescoping connection with the angle-lever 12. Set-screws, such as 14 and 14′, may be used for holding these telescoping connecting-rods in any desired adjusted positions. At the rear end thereof the rod 13 is connected in this case by means of a screw 15 to the lower end of an angle-lever, such as 16, supported by the rear section $c$ of the camera, said lever being pivoted in the present case on a lug 7‴, extending inwardly from the plate 7. Between this lever and the part or parts carried by the stock and controlling the operation of the shutter mechanism may be the universal connection hereinbefore mentioned.

As before stated, the shutter is intended to be set and released by triggers, two of which may be employed and may be of any suitable construction. These two triggers are designated herein by $t$ and $t'$, the former serving as the setting device for the shutter mechanism and the latter as the releasing device. Both are pivoted in the usual manner on the trigger-plate 4, and a suitable guard may cover them. These triggers will be usually spring-operated ones, and I have shown herein a spring 20 common to both triggers. This spring, however, does not press directly against the trigger $t'$, but against a tumbler, such as $t''$, coöperating directly with the trigger $t'$. Both of these triggers coöperate with a suitable shutter-actuator, the trigger $t$ directly and the trigger $t'$ through the tumbler $t''$. Here this shutter-actuator is in the form of a bolt $b$, which slides in the sleeve 2 and is connected at its forward end to the lever 16 by the universal joint hereinbefore mentioned and which is indicated by 21. At its rear end said bolt may have a slot 22, in which the upper or inner end of the trigger $t$ may work, while the tumbler $t''$ may engage in the usual manner a stop face or detent 23 at the under side of the bolt, near the rear end thereof. When the trigger $t$ is pulled, the bolt is forced forward and the tumbler $t''$ engages the stop-face 23 and latches the bolt in the usual manner, while the operating connections and the bar 10 cause the latter to set the shutter mechanism. This being done the camera is ready for exposure, and when properly sighted the trigger $t$ will be pulled, whereupon the tumbler $t''$ will release the bolt $b$ and the spring 10 will through the operating connections force the bolt back to its original position and at the same time operate the shutter to expose the plate or film.

The telescoping connections 13, 13′, and 13″ hereinbefore described may be covered by a guard, such as $g$, the main portion of which will be secured, preferably, to the under side of the camera and will have at its front and rear ends a pair of hinged or swinging sections $g'$ and $g''$, the former of which when dropped down will permit access to the screws 14 and 14′ to adjust the connections, while the latter when dropped permits access to the screw 15 to disconnect the rod 13 from the lever 16 and separate the camera from the stock.

A small button, such as 25, on the plate 7 may be used to hold up the section $g''$, Fig. 4, and the section $g'$ may be sustained in the same manner.

For the purpose of sighting the gun-camera I may use, in connection with a rear sight, such as $r$, on the stock, which sight may be of any suitable type, but will preferably be an adjustable "peep-sight," a pair of fore sights, such as $f$ and $f'$, which may coöperate selectively with the rear sight, the one when the camera is in its normal position (shown in Fig. 2) relatively to the gun-stock, while the latter will be used when the camera is turned around ninety degrees to expose the negative for a panel view. It will be noticed that the sighting portions or buttons of these two fore sights are at the same distance from the longitudinal axis of the camera, and hence either one when brought into alinement with the rear sight will be properly located relatively to the latter for a given range.

The plate or film to be used with the camera may be supported in any well-known manner in the rear end of the camera; but in the preferred construction I use plates and provide a suitable space for the reception of the plate-holder carrying the plate to be exposed. In the present construction I have indicated at 30 stop-ribs for locating this plate-holder, (indicated herein by P,) which plate-holder will be held in position ordinarily by suitable springs, as 31, which in this instance press against a follower 32 at the rear of the plate-holder P. Between the stop-ribs 30 and the inner side of the rear section $c$ of the camera may be a compartment or magazine for extra plate-holders, such as P′, and these plate-holders may be held firmly in place by springs 31′, similar to those shown at 31.

Suitable finders of the ordinary type may of course be employed in connection with the other parts of the camera, and when used will be so located as to coöperate with the camera in either of its two positions relatively to the stock.

My improved gun-camera is of course intended primarily to be raised to the shoulder and sighted at moving objects—such as birds, rapidly-moving horses, &c.—and may, as before stated, be used with the long side of the plate either in a vertical or in a horizontal position, and, moreover, the camera and stock forming the composite instrument or gun-camera are so connected that when they are disassembled the camera proper may be sighted in the usual manner when used either as a hand-camera or supported on a tripod.

Having described my invention, I claim—

1. In a gun-camera, the combination, with a gun-stock, of a single-chambered camera supported by said gun-stock and mounted to turn relatively thereto to bring either one of its transverse axes to a determined position relatively to the stock.

2. In a gun-camera, the combination, with a gun-stock, of a single-chambered camera supported by said gun-stock and mounted to turn relatively thereto to bring either one of its two transverse axes to a determined position relatively to the stock, and means for holding the camera in either of such positions.

3. In a gun-camera, the combination, with a gun-stock having trigger mechanism, of a single-chambered camera supported by said gun-stock and mounted to turn relatively thereto to bring either one of its transverse axes to a determined position relatively to the stock; shutter mechanism carried by the camera; and connecting means between the trigger mechanism and the shutter mechanism.

4. In a gun-camera, the combination, with a gun-stock, of an extensible camera supported by said gun-stock; shutter mechanism carried by said camera; and extensible operating connections from the gun-stock to the shutter.

5. In a gun-camera, the combination, with a gun-stock having trigger mechanism, of a telescoping camera supported by said gun-stock; shutter mechanism carried by said camera; and telescoping operating connections between the shutter mechanism and the trigger mechanism.

6. In a gun-camera, the combination, with a gun-stock, of a rotatable camera supported by said gun-stock; shutter mechanism carried by said camera; a shutter-actuator carried by the gun-stock; shutter-operating means; and a universal connection between the shutter-actuator and the shutter-operating means.

7. In a gun-camera, the combination, with a gun-stock, of a rotatable camera supported by said gun-stock; shutter mechanism carried by said camera; a shutter-actuator carried by the gun-stock and in alinement with the axis of rotation of the camera; shutter-operating means; and a universal connection between the shutter-actuator and the shutter-operating means.

8. In a gun-camera, the combination, with a gun-stock and with a rear sight carried by said gun-stock, of a single-chambered camera supported by said gun-stock and mounted to turn relatively thereto to bring either one of its two transverse axes to a determined position relatively to the stock; and a pair of fore sights carried by the camera at different sides thereof and coöperative selectively with the rear sight.

BENJAMIN D. SHEFFIELD.

Witnesses:
COOPER S. ROBESON,
MILLARD H. LATHAM.